Sept. 15, 1936.  S. J. ZAND  2,054,531
METHOD OF INSTALLING SOUND ABSORBING MATERIAL
Filed Jan. 8, 1936  2 Sheets-Sheet 1
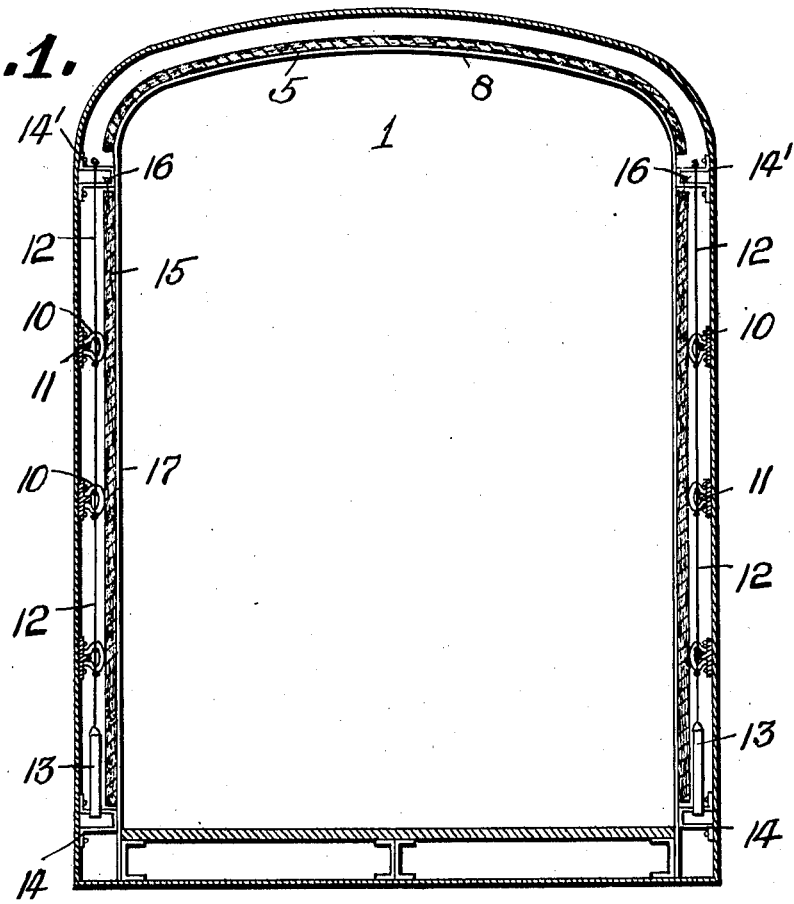
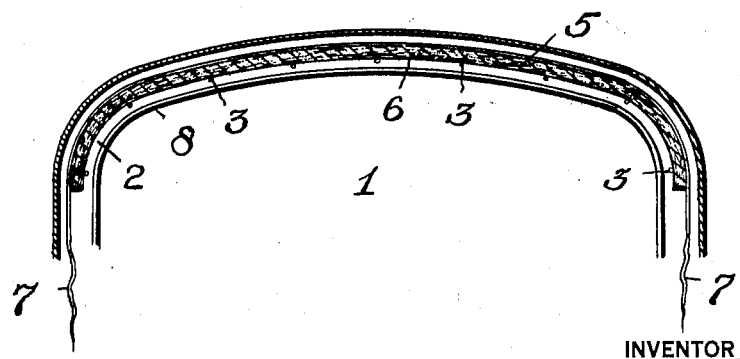
INVENTOR
STEPHEN J. ZAND
BY
Herbert H. Thompson
HIS ATTORNEY.

Sept. 15, 1936.   S. J. ZAND   2,054,531
METHOD OF INSTALLING SOUND ABSORBING MATERIAL
Filed Jan. 8, 1936   2 Sheets—Sheet 2
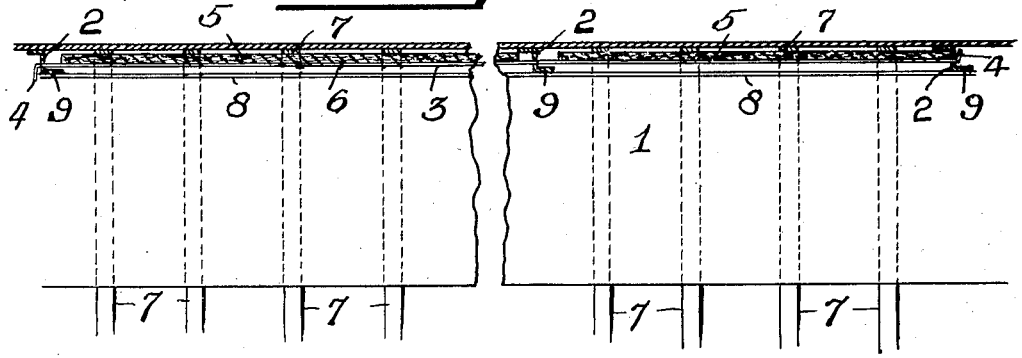
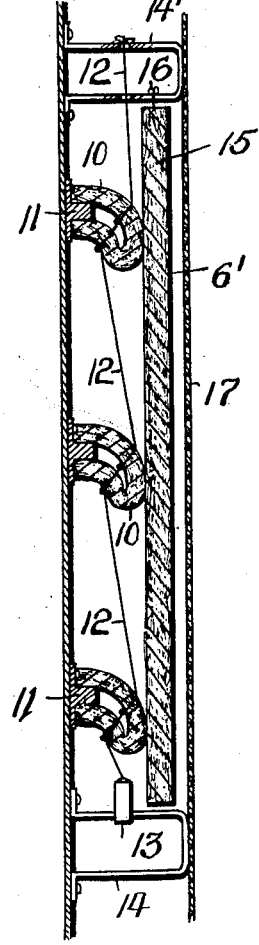
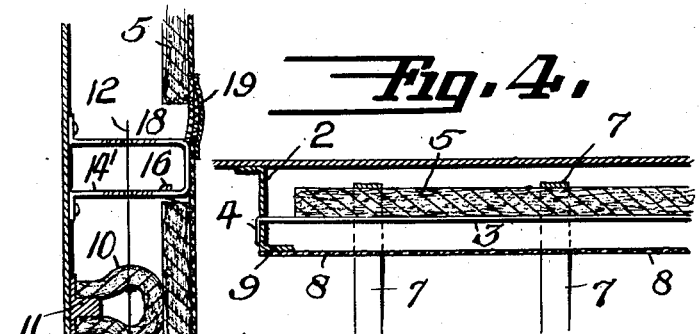
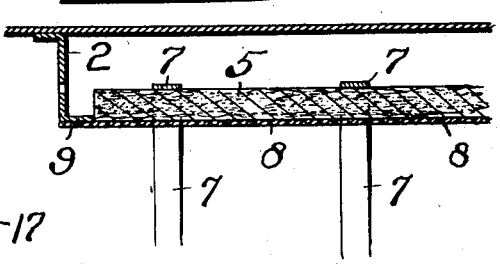
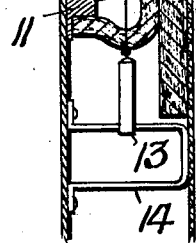
INVENTOR
STEPHEN J. ZAND
BY
Herbert H. Thompson
HIS ATTORNEY.

Patented Sept. 15, 1936

2,054,531

UNITED STATES PATENT OFFICE 2,054,531

METHOD OF INSTALLING SOUND ABSORBING MATERIAL

Stephen J. Zand, Forest Hills, N. Y., assignor to Sperry Gyroscope Company, Inc., Brooklyn, N. Y., a corporation of New York Application January 8, 1936, Serial No. 58,072

8 Claims. (Cl. 20—4)

This invention relates, generally, to the sound proofing of aircraft cabins, and the invention has reference, more particularly, to a novel method of installing sound absorbing material in such cabins.

It is known that a stretched cloth diaphragm loaded with a layer of felt on one surface thereof provides an efficient sound absorbing medium, especially for the lower range of frequencies, within which range of frequencies exist the dominant noises of aircraft motors and propellers, but heretofore it has been practically impossible to employ this type of sound insulating means in aircraft cabins, inasmuch as the inner wall fabric has to be mounted in place in the cabin and doped before applying the layer of felt to the back thereof, the mounting of the fabric in place rendering its back or hidden surface inaccessible for attaching felt thereto. If the felt is glued to the back of the fabric prior to the mounting and doping of the latter, the fabric will not shrink uniformly after subsequently applying the dope and ofttimes the adhering of the felt by adhesive to the fabric prevents any noticeable subsequent shrinkage of the fabric, with the result that the same will be loose and flabby and therefore entirely unsuitable for the purposes intended. It is therefore essential that the fabric be doped after installation in the cabin and that the felt be subsequently applied to the back surface thereof.

The principal object of the present invention is to provide a novel method of installing doped fabric, having a layer of felt adhered thereto, in aircraft cabins as a means of sound absorption.

Another object of the present invention lies in the provision of a novel method of the above character, wherein the felt layer is suspended within the hollow interior of the cabin wall by temporary supporting means, the felt having a suitable slow drying cement or glue applied to the surface thereof, and thereafter the fabric is applied to the cabin frame and doped to form the inner wall of the cabin, means being provided for thereafter moving the cemented felt against the back surface of the fabric to adhere the felt layer to the latter.

Other objects and advantages will become apparent from the specification, taken in connection with the accompanying drawings, wherein the invention is embodied in concrete form.

In the drawings,—

Fig. 1 is a sectional view, in elevation, of an airplane cabin having sound absorbing material therein installed by the method of this invention.

Fig. 2 is a fragmentary sectional view illustrating a step in the method of applying the sound insulation to the ceiling of an airplane cabin.

Fig. 3 is a fragmentary sectional view, with parts broken away, taken substantially longitudinally of the structure shown in Fig. 2.

Fig. 4 is an enlarged fragmentary view of a part of the structure shown in Fig. 3.

Fig. 5 is a view similar to Fig. 4, but illustrates a further step in the installation of the sound absorbing material.

Fig. 6 is an enlarged vertical sectional view illustrating a step in the method of installing the sound absorbing means in the side walls of the cabin, and Fig. 7 illustrates a further step in the installation of the sound absorbing material in the cabin side walls.

Referring now to Figs. 1 to 5, in installing the sound absorbing material in the ceiling of the aircraft cabin 1, a number of small holes are drilled through the bulkheads 2 of the cabin ceiling, such holes extending in a longitudinal direction. These holes are preferably spaced approximately a foot apart, transversely of the cabin, and through these holes are then pulled relatively light wires 3, as of copper, the wires extending longitudinally of the cabin and held taut by having their end portions secured temporarily to certain of the bulkheads 2 as by bending the end portions 4 of the wires 3 over, as shown in Figs. 3 and 4. Thus, the wires 3 are caused to provide a grid extending transversely of the cabin within the hollow ceiling thereof. A layer or layers of felt 5 are now cut to the desired size and a slow drying cement or glue 6 is applied to one surface thereof. A plurality of mutually spaced strips 7 of linen or other suitable material are attached to the opposite surface of the felt. These strips 7 are preferably spaced 18 or 24 inches apart and are of greater length than the felt layer or layers, so that the ends of the strips extend beyond the side edges of the felt. The felt 5 is then suspended upon the wires 3, as illustrated in Fig. 2, with the end portions of the strips 7 hanging down loosely at the sides of the cabin, the slow drying cement 6 being on the inner or lower surface of the felt 5. The felt layers 5 are intended to extend between bulkheads 2, as illustrated in Fig. 3.

The inner wall fabric 8, such as cotton duck, is now applied to the inner flanges 9 of the bulkheads 2, as by a suitable cement. The fabric is preferably stretched as much as practical when applied and thereafter the desired greater tensional stress is obtained by doping the fabric on its inner exposed surface. As many coats of dope may be applied to the fabric as is desired to give the same the desired tautness. Experience has shown that as the tautness of the fabric is thusly increased, a corresponding increase in the resonance frequency of the completed loaded diaphragm will result, causing a correspondingly higher frequency sound absorption range of such diaphragm. After the fabric has completely dried and shrunk, the wires 3 are disconnected from the bulkheads 2 and pulled out of the holes in the bulkheads, thereby allowing the felt layer 5 to drop upon the inner surface of the doped fabric 8. The free ends of the linen strips 7 are now pulled upon to force the felt layer 5 into close adhesion to the outer or back surface of the doped fabric 8, the slow drying cement 6 on the felt 5 serving to permanently adhere the felt layer to the fabric.

In installing the sound absorbing material in the side walls of the cabin, I first attach looped layers or flexible fingers of felt 10 to stringers 11 extending longitudinally of the cabin side walls, using preferably cement for this purpose. I then attach wires or strings 12 to each of the felt fingers or blocks 10, the wires 12 extending from one finger 10 to another and being secured to each of these fingers as shown in Fig. 6. The lower ends of the wires or strings 12 are attached to elastic members 13, such as strong rubber bands or coil springs that are attached to the longéron 14. The upper ends of the strings or wires 12 extend through apertures in the upper longéron 14', so that the upper ends of the wires or strings will lie above this longéron, as illustrated in Fig. 6. Initially, the felt blocks or fingers 10 are pulled down by the tension of the rubber bands 13 into the position shown in Fig. 6, these blocks taking a downwardly bent position so as to leave an appreciable space between the inner ends of the same and the plane of the inner cabin wall. The felt layer or layers 15 are cut to the desired size and suspended as by fasteners 16 from the upper longéron 14'. The felt is suspended from the longéron 14' in substantially abutting relation to the bent over felt blocks 10, in which position the inner surface of the felt 15 is spaced outwardly or rearwardly from the plane of the inner cabin wall, as shown in Fig. 6. Slow drying cement or glue 6' is applied to the inner surface of the felt 15. The fabric 17, which is to produce the inner side walls of the cabin, is then stretched and applied to the longérons 14 and 14' as by cementing, as shown in Fig. 6. Owing to the outward spacing of the felt 15 from the plane of the inner cabin wall, the same does not touch the fabric 17 at this time. The fabric 17 is now doped with the desired number of dope layers, thereby tensioning the same, and allowed to dry. After the fabric has dried, the upper ends of the strings or wires 12 are grasped and pulled upwardly through the apertures in longéron 14', thereby tensioning the bands 13 and pulling the felt blocks 10 upwardly and outwardly into their horizontal positions shown in Fig. 7, in which positions the ends of these felt blocks or fingers push the felt layer 15 inwardly and against the back surface of the doped fabric 17, thereby cementing the felt 15 to the fabric 17.

After the side walls and ceiling are dry, they are preferably painted with an opaque paint. In order to connect the ceiling fabric 8 and the wall fabric 17 together at their line of juncture, I employ sewing 18, as illustrated in Fig. 7, and thereafter cover the sewn line of juncture with a piece of trim 19 to enhance the appearance of the finished wall.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. The method of sound proofing aircraft cabins, comprising temporarily suspending insulating material having adhesive thereon in the space between the inner and outer wall planes of the cabin, applying the inner wall fabric of the cabin to the frame of the latter, and thereafter moving the insulating material into contact with the back surface of the inner wall fabric of the cabin, whereby the adhesive on the insulating material serves to secure the same to the cabin inner wall fabric for loading the latter.

2. The method of sound proofing aircraft cabins adapted to have doped fabric inner wall surfaces, comprising suspending a layer of insulating material having a slow drying adhesive thereon between the frame members of the cabin and outwardly of the plane of the inner wall surface thereof, attaching the inner wall fabric to the cabin frame, doping the fabric and, after the fabric has dried, moving the layer of insulating material inwardly against the back surface of the doped inner wall fabric, so as to cause said slow drying adhesive to secure the insulating layer to said doped fabric.

3. The method of sound proofing aircraft cabins adapted to have doped fabric inner wall surfaces, comprising suspending a layer of felted sheet material having a slow drying adhesive thereon between the frame members of the cabin and outwardly of the plane of the inner wall surface thereof, operating means being provided intermediate said felted sheet material and the outer skin of the cabin for moving said sheet material inwardly, attaching a stretched inner wall fabric to the cabin frame, doping the fabric, thereby increasing the tautness of the same, allowing the fabric to dry, and actuating said operating means to cause said felted sheet material to move into adhering engagement with the back surface of said inner wall fabric.

4. The method of installing sound absorbing material in aircraft cabins after the outer skin has been applied to the cabin frame but before the inner skin has been applied thereto, comprising suspending the sound absorbing material within the cabin frame and outwardly of the inner skin plane of the cabin on temporary supporting means, said sound absorbing material having slow drying adhesive applied thereto, attaching the inner skin to the cabin frame, and thereafter moving the sound absorbing material forwardly into contact with the rear surface of the inner skin so that said adhesive will adhere the sound absorbing material to the inner skin.

5. The method of installing felted sound absorbing material above the ceiling of aircraft cabins, comprising attaching temporary supporting members to the cabin frame above the ceiling, applying slow drying adhesive to one side of the felted sound absorbing material and attaching strips of material to the other side thereof, mounting said felted material upon said supporting members so that the side having the adhesive thereon is lowermost, attaching the ceiling to the cabin frame, removing the temporary supporting members and then pulling upon said strip material to press the sound absorbing material against the upper side of the ceiling so that the adhesive on said material will permanently adhere the latter to the ceiling.

6. The method of installing felted sound absorbing material above the ceiling of aircraft cabins, comprising attaching temporary supporting wire members to the cabin frame above the ceiling, applying slow drying adhesive to one side of the felted sound absorbing material and attaching strips of material to the other side thereof, mounting said felted material upon said supporting wire members so that the side having the adhesive thereon is lowermost, attaching the ceiling fabric to the cabin frame, doping the fabric, removing the temporary supporting wire members and then pulling upon said strip material to press the sound absorbing material against the upper side of the doped ceiling fabric, so that the adhesive on said material will permanently adhere the latter to the ceiling.

7. The method of installing felted sound absorbing material within the side walls of aircraft, comprising attaching flexible finger members to the aircraft frame adjacent the outer cabin skin for projecting toward the cabin interior, applying tension means to said finger members for deflecting the same from their inwardly projecting positions, suspending the felted sound absorbing material immediately in front of said deflected fingers, said material having adhesive applied to its inner surface, attaching the inner skin to the cabin frame, and actuating said tension means to cause said finger members to move into their inwardly projecting positions, during which movement said finger members press said felted sound absorbing material inwardly against said inner skin, whereby said adhesive serves to secure the sound absorbing material to the rear surface of the inner skin.

8. The method of installing felted sound absorbing material within the side walls of aircraft, comprising attaching flexible finger members to the aircraft frame adjacent the outer cabin skin for projecting toward the cabin interior, applying tensioned cords to said finger members for deflecting the same from their inwardly projecting positions, suspending the felted sound absorbing material immediately in front of said deflected fingers, applying slow drying adhesive to the exposed front face of said material, attaching the inner wall fabric to the cabin frame, doping the fabric, and after the fabric has dried, actuating said tensioned cords to cause said tension fingers to move into their inward projecting positions, during which movement said finger members press said felted sound absorbing material inwardly against said doped fabric, whereupon said adhesive serves to adhere the sound adsorbing material to the rear surface of the fabric.

STEPHEN J. ZAND.